No. 681,706. Patented Sept. 3, 1901.
C. D. JENKINS.
PROPELLING MECHANISM FOR VESSELS.
(Application filed Jan. 25, 1900.)
(No Model.)

WITNESSES.
C. H. Gannett.
J. Murphy.

INVENTOR.
Charles D. Jenkins
by Jas. H. Churchill
atty.

United States Patent Office.

CHARLES D. JENKINS, OF BOSTON, MASSACHUSETTS, ASSIGNOR TO CARTER, RICE AND COMPANY CORPORATION, OF SAME PLACE.

PROPELLING MECHANISM FOR VESSELS.

SPECIFICATION forming part of Letters Patent No. 681,706, dated September 3, 1901.

Application filed January 25, 1900. Serial No. 2,707. (No model.)

*To all whom it may concern:*

Be it known that I, CHARLES D. JENKINS, a citizen of the United States, residing in Boston, in the county of Suffolk and State of Massachusetts, have invented an Improvement in Propelling Mechanism for Vessels, of which the following description, in connection with the accompanying drawings, is a specification, like letters on the drawings representing like parts.

This invention relates to mechanism for propelling vessels driven by power, and is especially designed and adapted for use on steamships, yachts, and other boats.

The invention has for its object to provide propelling mechanism with which a maximum speed may be obtained with a minimum expenditure of power and one which can be readily applied to steamships and like vessels as now constructed without change. For this purpose I employ two Archimedean screws, which are extended alongside of the ship near the keel and have their shafts supported in suitable bearings projecting from the outer side of the ship. The screws are preferably made tapering, being smaller at their front end, and the shafts of said screws extended beyond the stern-post of the vessel and have fast on them gears which mesh with and are driven by an intermediate gear on the usual propeller-shaft. The gears referred to may be of ordinary construction; but I prefer to make them with a toothed rim and radial arms, which latter are made in the form of blades of a screw or propeller, so that the ship may be provided with three screw-propellers in addition to the longitudinally-extended screws on opposite sides of the vessel. These and other features of this invention will be pointed out in the claims at the end of this specification.

Figure 1:
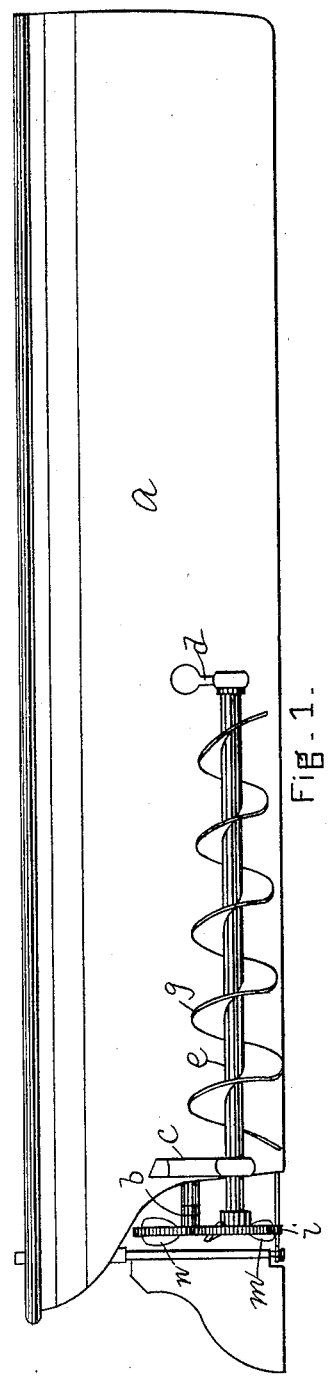
Figure 2:
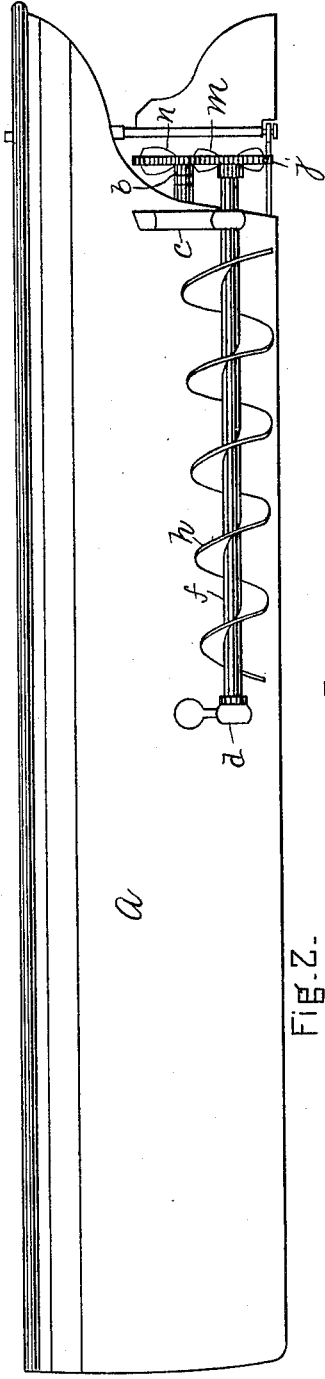
Figure 3:
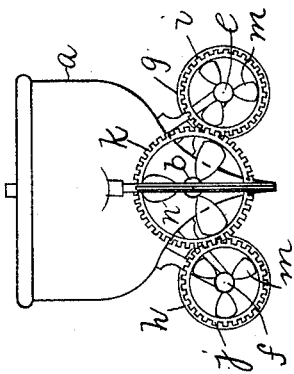

Figures 1 and 2 are opposite side elevations of a vessel provided with a propelling mechanism embodying this invention, and Fig. 3 a rear elevation of the vessel shown in Figs. 1 and 2.

Referring to the drawings, $a$ represents the hull of a steamship, yacht, or other vessel which is propelled by steam or other power, and for purposes of illustration it may be supposed to be provided with a suitable engine for rotating the shaft $b$, which may be the usual propeller-shaft. In accordance with this invention, the vessel $a$ has attached to its opposite sides brackets or hangers $c\ d$, which support in suitable bearings the shafts $e\ f$ of two Archimedean screws $g\ h$, preferably made tapering, with the smaller diameter at the front end of the screw. The shafts $e\ f$ are extended rearward beyond the stern-post of the vessel and have fast on them two gears $i\ j$, (see Fig. 3,) which mesh with and are driven in the same direction by the gear $k$ on the shaft $b$. The gears $i\ j$ are preferably provided with radial arms $m$, made in the form of the blades of the ordinary screw-propeller, and the gear $k$ is provided with like radial arms $n$, except that the arms or screw-blades $n$ are inclined in an opposite direction from the screw-blades or arms $m$, owing to the fact that the gear $k$ revolves in an opposite direction from the gears $i\ j$. The Archimedean screws $e\ f$ may be made of a length equal to substantially one-half the length of the vessel or they may be made longer or shorter, if desired. In operation the shaft $b$ may be driven by a suitable engine, or it may be a motor, and the rotation of this shaft in one direction imparts rotation to the two Archimedean screws in the opposite direction. The Archimedean screws serve to propel the vessel at a maximum speed with a minimum expenditure of power, and the action of the said screws is augmented by the three screw-propellers formed by the radial arms of the gears $i\ j$, and the reversal of the radial arms of the gears $k$ has the effect of adding the propelling action of the intermediate gear to the gears $i\ f$. The rim on the propelling-gears acts to prevent splashing and churning of the water by the screw-propellers or radial arms and increases the propelling force of said screws.

I claim—

1. The combination with a vessel provided with a driving-shaft having a gear fast thereon outside of the vessel, of Archimedean screws having bearings on opposite sides of said vessel and provided with gears in mesh with the gear on the driving-shaft, substantially as described.

2. The combination with a vessel provided with a driving-shaft, of Archimedean screws extended longitudinally of the vessel on opposite sides thereof, means attached to said vessel to support said screws, gears on the shafts of said screws provided with radial blades, and a gear on the driving-shaft in mesh with the gears on said screw-shafts and provided with radial blades extended reversely to the radial blades of the gears on the screw-shafts, substantially as described.

3. The combination with a vessel provided with a driving-shaft extended rearwardly beyond the said vessel and provided with a gear fast thereon, of two Archimedean screws located on opposite sides of the vessel near the keel and extended longitudinally of said vessel, brackets attached to said vessel in which the shafts of said screws revolve, and gears on said screw-shafts in mesh with the gear on the driving-shaft, substantially as described.

In testimony whereof I have signed my name to this specification in the presence of two subscribing witnesses.

CHARLES D. JENKINS.

Witnesses:
JAS. H. CHURCHILL,
J. MURPHY.